United States Patent [19]

Friedman et al.

[11] Patent Number: 4,958,898
[45] Date of Patent: Sep. 25, 1990

[54] SILICON DOUBLE-INJECTION ELECTRO-OPTIC MODULATOR WITH INSULATED-GATE AND METHOD OF USING SAME

[75] Inventors: Lionel Friedman, Holden; Richard A. Soref, Newton Centre, both of Mass.

[73] Assignee: The United States of America as Represented by the Secretary of the Air Force, Washington, D.C.

[21] Appl. No.: 323,738

[22] Filed: Mar. 15, 1989

[51] Int. Cl.[5] .......................... G02B 6/10; H01L 29/06
[52] U.S. Cl. ........................... 350/96.14; 350/96.13; 350/96.11; 350/96.12; 350/320; 357/19; 357/20; 357/23.4; 357/23.12; 357/23.14; 357/30
[58] Field of Search ............... 350/96.10, 96.11, 96.12, 350/96.13, 355, 96.14, 96.15, 320; 357/17, 19, 20, 23.1, 25, 30, 23.4, 23.12, 23.14

[56] References Cited

U.S. PATENT DOCUMENTS

| | | | |
|---|---|---|---|
| 3,970,364 | 7/1976 | Gerson et al. | 350/355 X |
| 4,693,547 | 9/1987 | Soref et al. | 350/96.13 |
| 4,728,167 | 3/1988 | Soref et al. | 350/96.13 |
| 4,737,003 | 4/1988 | Matsumura et al. | 350/96.14 |
| 4,746,183 | 5/1988 | Soref et al. | 350/96.14 |
| 4,784,451 | 11/1988 | Nakamaura et al. | 350/96.14 |
| 4,787,691 | 11/1988 | Lorenzo et al. | 350/96.14 |
| 4,789,642 | 12/1988 | Lorenzo et al. | 437/24 |
| 4,832,430 | 5/1989 | Tada et al. | 350/96.14 |
| 4,840,446 | 6/1989 | Nakamura et al. | 350/96.13 |
| 4,844,572 | 7/1989 | Popovic | 350/96.14 |
| 4,877,299 | 10/1989 | Lorenzo et al. | 350/96.14 |

*Primary Examiner*—Brian Healy
*Attorney, Agent, or Firm*—Robert L. Nathans; Donald J. Singer

[57] ABSTRACT

A double-injection transistor structure with an MOS gate is utilized as a guided-wave electro-optic phase modulator at infrared wavelengths in a silicon-on-insulator (SOI) waveguide. Cathode, gate and anode regions are integrated in the waveguide, longitudinally. The effective phase modulation is given by the voltage-variable overlap of the guided-mode optical field with carrier-induced local changes in the silicon refractive index. An electron-hole plasma is injected under the gate by cathode and anode. Using depletion-layer widening, the plasma channel width and mode overlap are controlled very rapidly by one or two low-power gate electrodes.

39 Claims, 2 Drawing Sheets

SILICON DOUBLE-INJECTION ELECTRO-OPTIC MODULATOR WITH INSULATED-GATE AND METHOD OF USING SAME

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of modulation and switching of light within optical waveguides.

Considerable interest has been shown in the transmission of large amounts of information from many sources to many destinations by means of beams of light transmitted through optical waveguides. Information is modulated upon the beams of light and the beams are thereafter switched appropriately through a network of light guides or fiber optic elements to be routed to desired destination. Devices for switching the light beams by electronic control involve waveguides surrounded by material of lower refractive index to confine the light. 2×2 "X" waveguide switches of the 2-mode interference type have a waveguide in the mid-region of the switch whose dimensions are large enough to propagate the two lowest-order modes within the waveguide. The waveguide formed at the intersection of the monomode input guides of the "X"-type switch utilizes means for controlling the electric field or free-carrier density within the guide to in turn cause changes in the index of refraction of various cross-sectional portions of the switch intersection, and as a result, the velocity of propagation of the even mode relative to the odd mode is differentially affected to switch the direction of the output light beam. U.S. Pat. No. 4,693,547 teaches utilizing an LED for switching control and U.S. Pat. Nos. 4,746,183, 4,787,691, and 4,728,167 issued to R. Soref and J. Lorenzo and incorporated herein by reference, teach utilizing pn junctions to inject free carriers into the waveguide at the X-switch intersection.

In proposed devices, the electro-optic controller consisted of an elongated diode on a rib optical waveguide. In some cases, the diode was forward-biased to inject minority carriers into the waveguide. In others, the diode was reverse-biased so as to deplete the waveguide of ambient carriers. Although injection and depletion diodes are effective phase modulators, each has its limitations. The speed of the injector is limited by the carrier lifetime, and the required injection currents are greater than 10 mA. The depletion diode is faster and consumes less power, but the depleter requires a large background concentration of impurities in the waveguide ($3 \times 10^{17}$ impurities/cm$^3$) in order to attain large changes in carrier concentration during biasing. However, the moderately heavy doping requirement conflicts with other aspects of the device: it introduces propagation loss of about 3 dB/cm into the waveguide. In devices utilizing the present invention, the heavy doping requirement is relaxed because the modulated charge density may be determined jointly by double-injection combined with depletion. For further background with regard to these prior devices, see "Silicon Guided-Wave Optics" published by R. Soref and J. Lorenzo in "Solid State Technology"; November 1988, and the references cited therein.

SUMMARY OF PREFERRED EMBODIMENTS OF THE INVENTION

The electro-optic phase modulators of the present invention are made by integrating an elongated field effect "transistor" (FET) structure into a ridge optical waveguide. Overlap of the guided-mode field of propagated light with the FET charge distribution in planes transverse to the optical propagation direction occurs. The FET modulators are expected to offer fast response, low-power control, high modulation efficiency (both slope and absolute), waveguide heights of 0.2 to 0.4 microns, low propagation loss in the 3-d channel, and a relatively short interaction length for the modulation because both electrons and holes are injected. A silicon-on-insulator waveguide, which has tight confinement of light in the silicon, is preferred for the waveguiding medium because it offers a strong overlap of the fundamental guided mode with the "constrictable area" of the plasma.

By proposing "transistor" type modulators and switches, we have identified a new, generic technology that applies to several integrated optical materials and that offers advantages over the aforesaid prior-art diode-type modulators. Besides the aforesaid "X" switches, the 3-terminal phase modulators of the present invention may be used in 1×1 Mach-Zehnder intensity modulators, in 2×2 directional coupler switches, and in 2×2 TIR (total internal reflection) switches, etc.

More specifically, a new double-injection field-effect "transistor" (DIFET) with MOS-gate structure is preferred as a guided-wave electro-optic phase modulator in crystalline silicon at infrared wavelengths. The effective phase modulation is given by the voltage-variable overlap of the guided-mode optical field with local changes in the silicon refractive index, and the change in refractive index, in turn, is due to the injection of an electron-hole plasma by cathode and anode electrodes. The volume of waveguide filled by the plasma is controlled very rapidly by one or two low-power gate electrodes that constrict the plasma cross-section with their depletion layers. Our estimates of the change in effective mode index $N_{eff}$ show that the DIFET device is viable.

BRIEF DESCRIPTION OF THE DRAWINGS

Other objects, features and advantages of the present invention will become apparent upon study of the following detailed description taken in conjunction with the drawings in which.

DETAILED DESCRIPTION OF PREFERRED EMBODIMENTS OF THE INVENTION

In accordance with our invention, modulation information (or 2×2 switching commands) are impressed upon the gate electrode of a 3-terminal structure, and steady dc bias is provided between the other two electrical terminals. Although the aforesaid diode-controlled devices are valuable, we believe that triode light modulators will offer improved performance. Unlike a diode, the semiconductor triode can combine depletion with single injection, double injection, and pinchoff, and thus the triode has more degrees of freedom in its design and operation than the diode.

We prefer the use of double injection into a semiconductor as a means for enhancing the density of charge, thereby improving the efficiency with which refractive index changes are produced in the material. Double injection is the simultaneous injection of both electrons and holes from electron and hole injecting contacts, cathode and anode, respectively. It is known that the densities of carriers achieved in this way can be very much larger than equilibrium carrier densities, or than the densities resulting from the injection of charge of one sign. See Lampert, M. A., and Mark, P., "Current Injection in Solids", Academic Press, New York (1970). The injected densities are limited by relatively slow recombination processes in an indirect-gap semiconductor and possibly also by space charge. The space charge is the small difference between the large hole and electron densities, while the refractive index perturbation $\Delta N$ depends on the sum of the two large injected densities; hence, a large index change is possible for a modest cathode-anode voltage.

Control of the electrical properties of structures in which there is double injection has previously been considered for both amorphous silicon and crystalline silicon devices by means of a voltage applied to an insulated gate electrode; see Hack, M., Shur, M., and Czubatyj, W., Appl. Phys. Lett., 48, 1386 (1986); Xu, J., Shur, M., and Hack, M., "Amplification of Bipolar Current Flow by Charge Induced from an Insulated Gate Electrode", J. Appl. Phys., 62 (3), 1108, Aug. 1, 1987.

For our optical purposes, it is proposed that the control of the injected charge distribution in a single-mode silicon waveguide can be accomplished with a MOS gate in which a voltage-variable depletion width is used to control the effective cross-sectional area of a free carrier conducting channel. It is also known that the width of the channel in which the refractive index change occurs affects the propagation constant of the optical wave through the overlap of the $\Delta N$-profile with the optical field; see Adams, M. J., Ritchie, S., and Robertson, M. J., Appl. Phys. Lett., 48, 820 (1986).

Figure 1A:
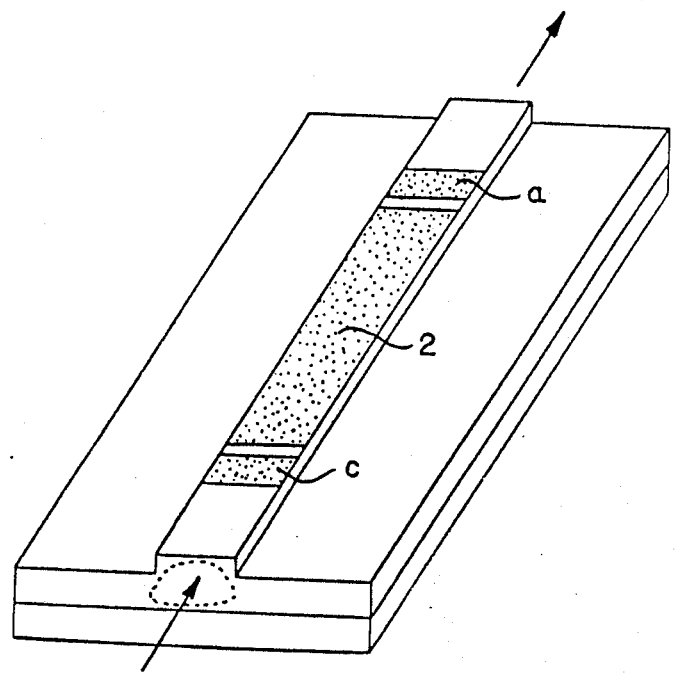
FIGS. 1a and 1b illustrate an in-line silicon channel waveguide modulator and 2×2 switch with triode electro-optical control.
Figure 1B:
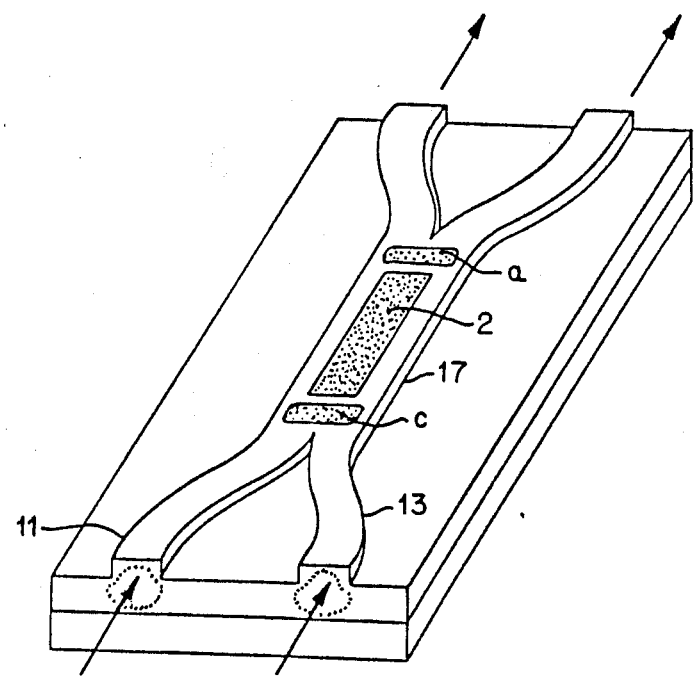

Perspective views of the proposed MOS-DIFET guided-wave devices are shown in FIGS. 1a and 1b, with cathode c, gate 2, and anode areas a indicated by shaded regions. The three active regions are deployed in sequence along the direction of optical propagation. Monolithic opto-electronic integration is used. FIG. 1a is a straight-through channel-waveguide phase modulator. FIG. 1b is a 2×2 electro-optical switch that operates by two-mode interference. It consists of intersecting channel waveguides 11 and 13 with a double-width waveguide portion 17. The gate electrode 2 is centered so as to perturb selectively the symmetric guided-mode in the intersection. To keep these drawings simple, the contact pads, electrical lead-in wires, and electrical bias supplies are not shown in FIGS. 1a and 1b.

Figure 2A:
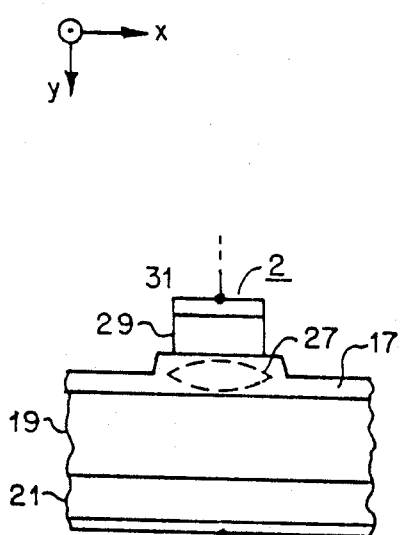
FIGS. 2a and 2b illustrate a MOS-gate DIFET in a silicon-on-insulator waveguide.
Figure 2B:
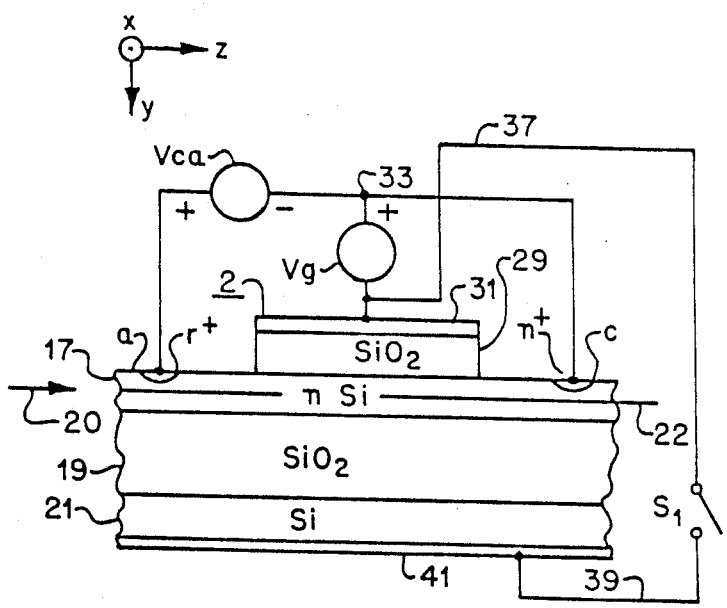

When constructing the 3-terminal light modulator, one has a choice of orienting the cathode-anode current flow produced by voltage source $V_{ca}$ of FIG. 2b parallel to (the longitudinal case), or at right angles to the optical propagation direction 2, (the transverse case). For the transverse case, it is found that the current density is approximately 2000 times larger than that in the longitudinal case for the same depth of optical modulation. Thus, the current density in the transverse case may be too high for practical application.

FIGS. 2a and 2b show the proposed DIFET modulator in cross-sectional views taken at the mid-planes in FIG. 1. FIG. 2a is a section in the x-y plane, transverse to the light propagation path. FIG. 2b is a y-z section along the light propagation path (axis 22). The optical waveguide 17 is fabricated from a layer of n-type crystalline silicon (containing 1 to $5 \times 10^{17}$ impurities/cm$^3$) formed upon an SiO$_2$ insulating layer 19 having a thickness of 0.7 to 1.0 micrometers, in turn formed upon silicon layer 21. The refractive index of the n-type Si material 17 is 3.505 at 1.3 micrometers, but the index of the "cladding" layer 19 is much lower: N(SiO$_2$)=1.46 at 1.3 micrometers. Because of the 2.045 index difference, the layer 19 produces strong vertical confinement of light in the silicon. If we choose a thickness for the silicon layer 17 ranging from 0.2 to 0.4 micrometers, that waveguide will be single mode in the y-direction (See E. A. J. Marcatili, Bell System Tech. Journal, 53, 645 (1974).

The SiO$_2$ lower cladding also serves an electrical function, as it prevents unwanted current flow between layer 19 and cathode, or between layer 19 and anode. As FIG. 2a shows, vertical-wall etching has been performed on Si guiding layer 17. This provides an upright rib geometry for 17 which confines light in the horizontal direction. Typically the etch-step height is one-half of layer thickness 17, for example, a 0.15 micrometer step in a 0.30 micrometer-high rib. If the rib width (x-direction) is 0.4–0.9 micrometer, then the waveguide will be single mode in the x-direction as well as single mode in the y-direction. The elliptical intensity profile of this x-y fundamental-mode guided beam is shown by line 27 in FIG. 2a.

The aforementioned cathode and anode regions doped n+ and p+ respectively, in FIG. 2b, consist of shallow indiffused or implanted regions with an impurity concentration of 2 to $10 \times 10^{18}$ impurities per cm$^3$. The depth of said regions in layer 17 is about 0.05 micrometers. When forward biased, the cathode injects electrons and the anode injects holes, thereby producing a free-carrier plasma in a tube-like region, under the insulated gate, parallel to axis 22.

The light to be modulated is directed along longitudinal axis 22. The first d.c. voltage source $V_{ca}$ applies about 0.5 volts across the cathode "a" and anode "c" to generate the desired plasma. This plasma overlaps the intensity profile 27 of the fundamental guided mode of light, as shown in FIG. 2a; the centerline of the plasma preferentially being coincident with the peak of the optical distribution.

The aforesaid gate electrode means comprises a thin (500 to 1000 Angstrom) layer 29 of SiO$_2$ superimposed upon Si layer 17 between cathode "c" and anode "a" as shown in FIG. 2b. The length of gate layer 29 would be typically 1000 to 4000 micrometers along the z-axis 22 in order to build up 180 degrees of optical phase retardation in the guided mode, at a wavelength of 1.3 micrometers. For a typical application in, for example, the interferometric X-switch discussed above, the thickness of SOI layer 19 would be 0.7 to 1.0 micrometers.

A very thin depletion layer exists in Si layer 17 under the gate layer 29 at zero gate bias. Upon application of about 10 to 15 volts (time varying; pulsed, or RF) from the control voltage source Vg, this depletion layer will widen and will "repel" the plasma. This widening will take place very rapidly. If, for example, layer 17 has a thickness of 0.25 micrometers, the free-carrier distribution will be constricted into a layer of thickness 0.05 micrometers or less at the bottom surface of 17 when Vg is about 10 v; that is, the conductive region will become pinched over at a vg or about 10 v. Due to the variable overlap, this pinchoff will result in a large change in the effective refractive index of the guided mode in 17, thereby producing the switching and other optical functions discussed previously. To be specific, the change in effective index of the mode should be in the range of $2-4\times10^{-4}$ at a wavelength of 1.3 micrometers for the above conditions of voltage biasing. ($\Delta N_{eff}$ is larger at longer wavelengths). In practice, the gate potential may swing from positive to negative values for the desired modulation; for example, from +2 volts to −8 volts.

The electrical connection 33 of cathode "c" to one side of source $V_{ca}$ and source $V_g$ forms a common voltage reference or "ground" for the device. This embodiment, may be called a metal-oxide-semiconductor (MOS)-gate controlled DIFET lightwave modulator.

Figure 3:
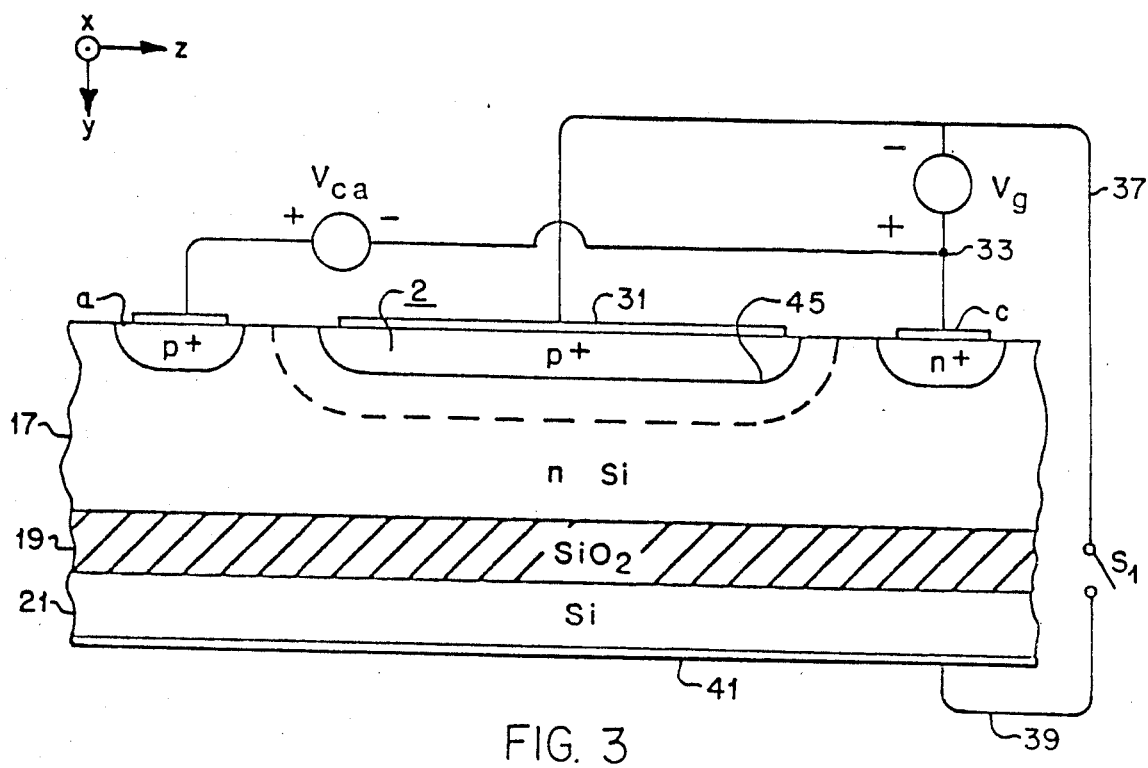
FIG. 3 illustrates a junction gate DIFET.

In FIG. 3, a junction-gate DIFET lightwave modulator is illustrated. Here, the gate consists of an indiffused or implanted p+ region in Si layer 17, which forms an abrupt p+/n junction 45 in the Si waveguide (the junction gate) in lieu of the MOS gate. The remaining components of FIG. 3 have, for the most part, similar characteristics, such as doping dimensions, and voltages, as the like-numbered components described above in connection with FIGS. 2a and 2b. The bias potentials $V_{ca}$ and $V_g$ are very much the same as before. The depth of gate junction 45 is about 0.05 μm below the top surface of silicon layer 17, and the waveguide occurs below this junction.

The operation of lightwave modulator, FIG. 3, is very similar to that of FIGS. of 2a and 2b, with depletion-layer widening and pinchoff of the double-injected plasma. The difference between FIGS. 2 and 3 is that the injection is less efficient in FIG. 3. In the junction gate device of FIG. 3, there will be some unwanted current flow between cathode "c" and junction gate 45. This will produce fewer free carriers under the gate in FIG. 3 for a given cathode-anode bias than in FIG. 2. Consequently, the depth of modulation $\Delta N$ will be lower in FIG. 3 than in FIG. 2 for identical conditions.

In both of the aforesaid embodiments of the invention, an additional layer of silicon 21 is provided beneath $SiO_2$ layer 19. Normally, that layer is not used, and the electrical switch S1 is normally open, which gives single-action gating in the modulator. However, there is an alternative method of operation. If we make Si layer 21 heavily doped so that it is electrically conductive (like a metal), then the closing of $S_1$ will connect Ohmic contact 41 via leads 37 and 39 to the potential source Vg. In this case, the $SiO_2$ layer 19 will now act as an insulated gate on the bottom surface of Si layer 17, although the action of this gate will be reduced relative to upper gate 2 because the $SiO_2$ layer 19,(5000–8000 Å thick), is substantially thicker than layer 29 having a thickness of 500–1000 Å. The thickness of the lower $SiO_2$ layer 19 within the 5000–8000 Å range will enable satisfactory gate action with moderately low voltage. Now there will be upper and lower gates on waveguide 17, gates that are electrically in parallel (one voltage source for 31 and 39). This should provide a double gating action, giving nearly twice the constriction of the free-carrier flow per unit of gate voltage as compared to the single-gate case. Thus the figure of merit $\Delta N/\Delta V$ should be higher. In both embodiments, light is confined vertically in the Si layer 17 by low-index layer 19 as taught in U.S. Pat. No. 4,789,642 (Soref et al) and by others.

As other embodiments of the invention will occur to those skilled in the art, the scope of the invention is to be defined by the terms of the following claims and art recognized equivalents. For example, the n-type waveguide material may be interchanged with p-type material with appropriate reversals in the polarity of applied voltages.

What is claimed is:

1. Apparatus for changing the refractive index of a light transmitting semiconductor waveguide having a longitudinal axis comprising:
   (a) a light transmitting semiconductor waveguide;
   (b) injection means for producing a flow of free carriers along a carrier conduction channel within said light transmitting semiconductor waveguide; and
   (c) gate control means for controlling the effective cross-sectional area of said carrier conduction channel by inducing at least one depletion region within said light transmitting semiconductor waveguide.

2. The apparatus of claim 1 wherein said injection means injects both holes and electrons into said light transmitting semiconductor waveguide for inducing an electron-hole plasma therein.

3. The apparatus of claim 1 wherein said injection means comprises an anode electrode and a cathode electrode both mounted upon said light transmitting semiconductor waveguide, first voltage supply means electrically coupled between said anode electrode and said cathode electrode, and wherein said gate control means includes a gate electrode means mounted upon said waveguide, together with a gate control second voltage supply source electrically coupled thereto.

4. The apparatus of claim 2 wherein said injection means comprises an anode electrode and a cathode electrode both mounted upon said light transmitting semiconductor waveguide, first voltage supply means electrically coupled between said anode electrode and said cathode electrode, and wherein said gate control means includes a gate electrode means mounted upon said semiconductor waveguide, together with a gate control second voltage supply source electrically coupled thereto.

5. The apparatus of claim 4 wherein said semiconductor waveguide comprises an n type semiconductor material, said anode electrode comprises a p+ type semiconductor material formed within said semiconductor waveguide, said cathode electrode comprises an n+ type semiconductor material formed within said semiconductor waveguide, and said gate electrode means includes a thin layer of an insulating dielectric on the top surface of the semiconductor waveguide, the insulating dielectric being covered by a metal layer.

6. The apparatus of claim 3 wherein said gate electrode means is positioned between said anode electrode and said cathode electrode along the longitudinal axis of said light transmitting semiconductor waveguide.

7. The apparatus of claim 4 wherein said gate electrode means is positioned between said anode electrode and said cathode electrode along the longitudinal axis of said light transmitting semiconductor waveguide.

8. The apparatus of claim 5 wherein said gate electrode means is positioned between said anode electrode and said cathode electrode along the longitudinal axis of said light transmitting semiconductor waveguide.

9. The apparatus of claim 4 wherein said gate electrode means comprises a first insulating layer mounted upon an upper surface portion of said semiconductor waveguide and a metallic electrode overlaying said insulating layer.

10. The apparatus of claim 9 further including a second insulating layer contacting a lower surface portion of said semiconductor waveguide and wherein said second insulating layer has a thickness of 0.5 to 1.0 micron and is in turn formed on a Si substrate.

11. The apparatus of claim 9 wherein said first insulating layer has a thickness of 500–1000 angstroms and said light transmitting semiconductor waveguide has a thickness of 1500–2500 angstroms.

12. The apparatus of claim 10 wherein said first insulating layer has a thickness of 500–1000 angstroms and said light transmitting semiconductor waveguide has a thickness of 1500–2500 angstroms.

13. The apparatus of claim 1 wherein said carried conduction channel comprises crystalline Si having $1-5 \times 10^{16}$ impurity atoms/cm$^3$ therein.

14. The apparatus of claim 2 wherein said carrier conduction channel comprises crystalline Si having $1-5 \times 10^{16}$ impurity atoms/cm$^3$ therein.

15. The apparatus of claim 4 wherein said carrier conduction channel comprises crystalline Si having $1-5 \times 10^{16}$ impurity atoms/cm$^3$ therein.

16. The apparatus of claim 9 wherein said carrier conduction channel comprises crystalline Si having $1-5 \times 10^{16}$ impurity atoms/cm$^3$ therein.

17. The apparatus of claim 10 wherein said carrier conduction channel comprises crystalline Si having $1-5 \times 10^{16}$ impurity atoms/cm$^3$ therein.

18. The apparatus of claim 11 wherein said carrier conduction channel comprises crystalline Si having $1-5 \times 10^{16}$ impurity atoms/cm$^3$ therein.

19. The apparatus of claim 12 wherein said carrier conduction channel comprises crystalline Si having $1-5 \times 10^{16}$ impurity atoms/cm$^3$ therein.

20. A method of phase modulating a light beam comprising the steps of:
  (a) propagating a light beam along the longitudinal axis of a light transmitting semiconductor waveguide;
  (b) injecting a flow of free carriers into said light transmitting semiconductor waveguide, overlapping the lowest-order fundamental guided mode optical field of said light beam;
  (c) producing at least one depletion region within said light transmitting semiconductor waveguide adjacent to said flow of free carriers; and
  (d) altering the size of said depletion region for controlling the effective cross-sectional area of said flow of free carriers.

21. The method of claim 20 wherein step (b) comprises injecting a two-carrier plasma of holes and electrons into said waveguide.

22. The method of claim 20 wherein a portion of said flow of free carriers is produced parallel to the longitudinal axis of said light transmitting semiconductor waveguide.

23. The method of claim 21 wherein a portion of said flow of free carriers is produced parallel to the longitudinal axis of said light transmitting semiconductor waveguide.

24. The method of claim 22 wherein central portions of said flow of free carriers coincide with the intensity profile peak of the fundamental guided mode of said light beam.

25. The method of claim 23 wherein central portions of said two-carrier plasma coincide with the intensity profile peak of the fundamental guided mode of said light beam.

26. An optical phase modulator comprising:
  (a) first and second carrier injection means formed with a semiconductor light propagating waveguide for forming an electron-hole plasma therein;
  (b) a direct current forward biasing first voltage source having a first terminal coupled to the first carrier injection means and a second terminal coupled to the second carrier injection means;
  (c) a second voltage source having a first terminal coupled to a gate electrode means positioned upon said semiconductor light propagating waveguide and a second terminal coupled to said waveguide for increasing at least one depletion zone therein upon the increase of voltage applied to said gate electrode means, thereby to alter the phase of light propagated through said semiconductor waveguide.

27. The modulator of claim 26 including means for coupling the second terminals of said first and second voltage sources to each other.

28. The modulator of claim 26 wherein said light transmitting waveguide comprises a layer of crystalline Si having a thickness of 1500–2500 angstroms and a coping of $1-5 \times 10^{16}$ impurities/cm$^3$, formed upon an electrically insulating substrate.

29. The modulator of claim 27 wherein said light transmitting waveguide comprises a layer of crystalline Si having a thickness of 1500–2500 angstroms and a doping of $1-5 \times 10^{16}$ impurities/cm$^3$, formed upon an electrically insulating substrate.

30. The modulator of claim 28 wherein said insulating substrate includes a bottom semiconductor layer and an overlaying insulating isolation layer 5000–8000 Å thick for containing propagated light within said layer of crystalline Si.

31. The modulator of claim 29 wherein said insulating substrate includes a bottom semiconductor layer and an overlaying insulating isolation layer pb 5000–8000 Å thick for containing propagated light within said layer of crystalline Si.

32. The modulator of claim 30 wherein said bottom semiconductor layer is heavily doped and further including means for electrically coupling the gate electrode means to said bottom semiconductor layer for enabling double sided constriction of said plasma within said layer of crystalline Si.

33. The modulator of claim 31 wherein said bottom semiconductor layer is heavily doped and further including means for electrically coupling the gate electrode means to said bottom semiconductor layer for enabling double sided constriction of said plasma within said layer of crystalline Si.

34. The modulator of claim 26 wherein said first voltage source applies sufficient voltage across said first and second carrier injection means to form said plasma, and said second voltage source generates gating voltage pulses having amplitudes of 10–15 volts.

35. The modulator of claim 27 wherein said first voltage source applies sufficient voltage across said first and second carrier injection means to form said plasma, and said second voltage source generates gating voltage pulses having amplitudes of 10–15 volts.

36. The modulator of claim 28 wherein said first voltage source applies sufficient voltage across said first and second carrier injection means to form said plasma, and said second voltage source generates gating voltage pulses having amplitudes of 10–15 volts.

37. The modulator of claim 29 wherein said first voltage source applies sufficient voltage across said first and second carrier injection means to form said plasma, and said second voltage source generates gating voltage pulses having amplitudes of 10–15 volts.

38. Apparatus for changing the refractive index of a light transmitting semiconductor waveguide having a longitudinal axis comprising:
  (a) a light transmitting n type semiconductor waveguide;
  (b) injection means for injecting both holes and electrons along a carrier conduction channel within said light transmitting semiconductor waveguide;
  (c) gate control means for controlling the effective cross-sectional area of said carrier conduction channel by inducing at least one depletion region within said light transmitting semiconductor waveguide, and wherein said injection means comprises an anode electrode and a cathode electrode both mounted upon said light transmitting semiconductor waveguide, first voltage supply means electrically coupled between said anode electrode and said cathode electrode, and wherein said gate control means includes a gate electrode means, together with a gate control second voltage supply source electrically coupled thereto, said gate electrode means further comprising a p+/n junction formed within said waveguide.

39. The apparatus of claim 38 wherein said semiconductor waveguide comprises crystalline Si having $1-5 \times 10^{16}$ impurity atoms/cm$^3$ therein.

* * * * *